(12) United States Patent  
Bradshaw et al.

(10) Patent No.: US 7,673,176 B2
(45) Date of Patent: Mar. 2, 2010

(54) APPARATUS AND METHOD TO LOCATE A FAILED DEVICE IN A DATA STORAGE SYSTEM

(75) Inventors: Richard Lionel Bradshaw, Tucson, AZ (US); Gregg Steven Lucas, Tucson, AZ (US); Andrew Ellis Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 11/532,495

(22) Filed: Sep. 15, 2006

(65) Prior Publication Data

US 2008/0122646 A1     May 29, 2008

(51) Int. Cl.
*G06F 11/00* (2006.01)
(52) U.S. Cl. .............................. 714/25; 714/14; 714/48
(58) Field of Classification Search ................... 714/14, 714/25, 48
See application file for complete search history.

(56) References Cited

U.S. PATENT DOCUMENTS 5,859,496 A    1/1999   Murazaki et al.
6,067,506 A *  5/2000   Goldys et al. ............... 702/117
6,155,699 A    12/2000  Miller et al.
6,479,936 B1   11/2002  Martinez
6,487,623 B1 * 11/2002  Emerson et al. ............. 710/302
6,694,831 B2 *  2/2004  Assimos et al. ............ 73/865.8
7,001,639 B2    2/2006  Murasko et al.
7,395,460 B2 *  7/2008  El-Batal ...................... 714/57
2002/0063257 A1  5/2002  Wang
2004/0256626 A1  12/2004 Wang et al.

FOREIGN PATENT DOCUMENTS

JP      08-329897     12/1996
JP      11-144685     5/1999
JP      04-117891     4/2004

OTHER PUBLICATIONS

American Environmental Products, Terrorist-Proof Lighting, pp. 1-2, http://license.icopyright.net/user/viewFreeUse.act?fuid=MzkxOTk4NA%3D%3D.*

* cited by examiner

*Primary Examiner*—Robert Beausoilel
*Assistant Examiner*—Charles Ehne
(74) *Attorney, Agent, or Firm*—Dale F. Regelman; Quarles & Brady LLP

(57) ABSTRACT

A computing device comprising a plurality of devices and a plurality of visual indicators is disclosed. Each of the plurality of visual indicators is interconnected with a power source and is associated with a different one of the plurality of devices. None of the plurality of visual indicators comprises a capacitor.

5 Claims, 11 Drawing Sheets

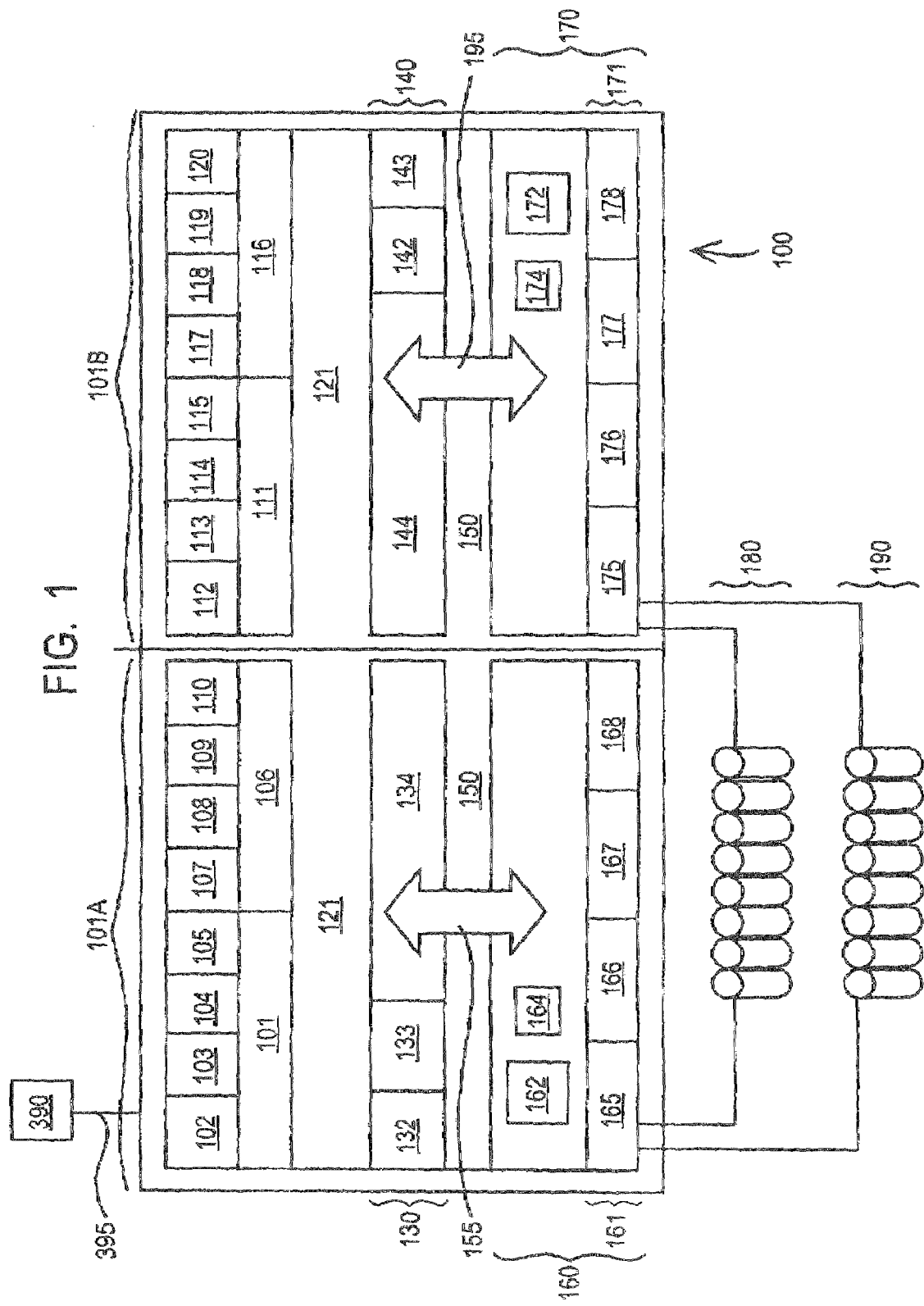

APPARATUS AND METHOD TO LOCATE A FAILED DEVICE IN A DATA STORAGE SYSTEM

FIELD OF THE INVENTION

This invention relates to an apparatus and method to locate a failed device disposed in a computing device. In certain embodiments, the invention is directed to an apparatus and method to locate a failed data storage device disposed in a data storage system.

BACKGROUND OF THE INVENTION

In the event a device disposed in a computing system fails, then that device must be either repaired or replaced. In order to either repair or replace a failed device, the supply of power to that failed device must be temporarily discontinued.

After discontinuing the supply of power to the failed device, and/or to the computing system comprising the failed device, it can be difficult to identify the failed device. What is needed is an apparatus and method to visually indicate a failed device disposed in a computing system when the power to the failed device and/or the power to a computing system comprising the failed device, has been interrupted.

SUMMARY OF THE INVENTION

Applicants' invention comprises a computing device comprising a plurality of devices and a plurality of visual indicators, where each of the plurality of visual indicators is interconnected with a power source and is associated with a different one of the plurality of devices, and none of Applicants' plurality of visual indicators comprises a capacitor.

Applicants' invention further comprises a method to locate a failed device in a computing device. The method detects a failed device, and energizes the visual indicator associated with that failed device. Thereafter, the supply of power to the plurality of devices and to the plurality of visual indicators is interrupted. After power interruption, Applicants' method locates the visual indicator emitting visible light, and identifies, the failed device as the device associated with the visual indicator emitting visible light.

BRIEF DESCRIPTION OF THE DRAWINGS

The invention will be better understood from a reading of the following detailed description taken in conjunction with the drawings in which like reference designators are used to designate like elements, and in which:

FIG. 1 is a block diagram showing one embodiment of Applicants' data storage system;

DETAILED DESCRIPTION OF THE PREFERRED EMBODIMENTS

Figure 2A:
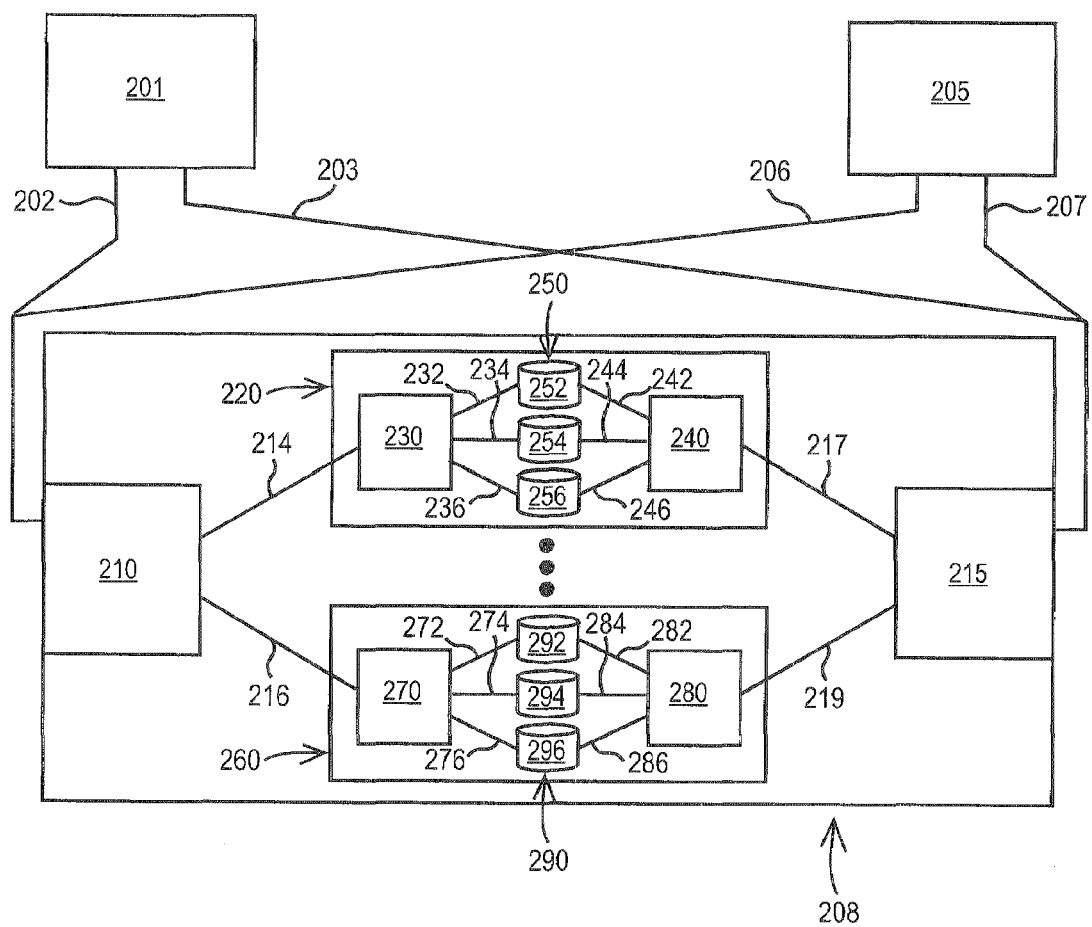
FIG. 2A is a block diagram showing a first embodiment of Applicants' data storage system comprising a data storage device enclosure comprising a plurality of data storage devices.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' apparatus and method to detect a failed device disposed in a computing system is described herein as embodied in a plurality of visual indicators, wherein each of those visual indicators is associated with a different one of a plurality of data storage devices. Applicants' method is not limited to detecting a failed data storage device, as Applicants' apparatus and method can be used generally to detect a failed device disposed in a computing system. By "device," Applicants mean any component, assembly, or subassembly, disposed in a computing system, such as and without limitation a circuit board, an individual component disposed on a circuit board, a data storage device, a power supply, controller, and the like.

Referring now to FIG. 1, data storage system 100 is capable of communication with host computer 390 via communication link 395. The illustrated embodiment of FIG. 1 shows a single host computer. In other embodiments, Applicants' data storage system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage system, such as the IBM DFSMS implemented in the IBM MVS operating system.

In certain embodiments, Applicants' data storage system includes a plurality of host adapters. In the illustrated embodiment of FIG. 1, system 100 comprises host adapters 102-105, 107-110, 112-115 and 117-120. In other embodiments, Applicants' data storage system includes fewer than 16 host adapters. In still other embodiments, Applicants' data storage system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, one or more SAS ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 17s, I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage system. Similarly, in certain embodiments, one or more host adapters, processor portion 140, one or more device adapters are disposed on a second control card disposed in Applicants' data storage system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Referring now to FIG. 2A, in certain embodiments Applicants' data storage system comprises system controller 201 and system controller 205. In certain embodiments, controller 201 comprises a RAID controller. In certain embodiments, controller 201 comprises an initiator. In certain embodiments, controller 201 comprises processor 132, memory 133, one or more host adapter ports 101, and one or more device adapter ports 161. In certain embodiments, controller 205 comprises a RAID controller. In certain embodiments, controller 205 comprises an initiator. In certain embodiments, controller 205 comprises processor 142, memory 143, one or more host adapter ports 111, and one or more device adapter ports 171.

Figure 2B:
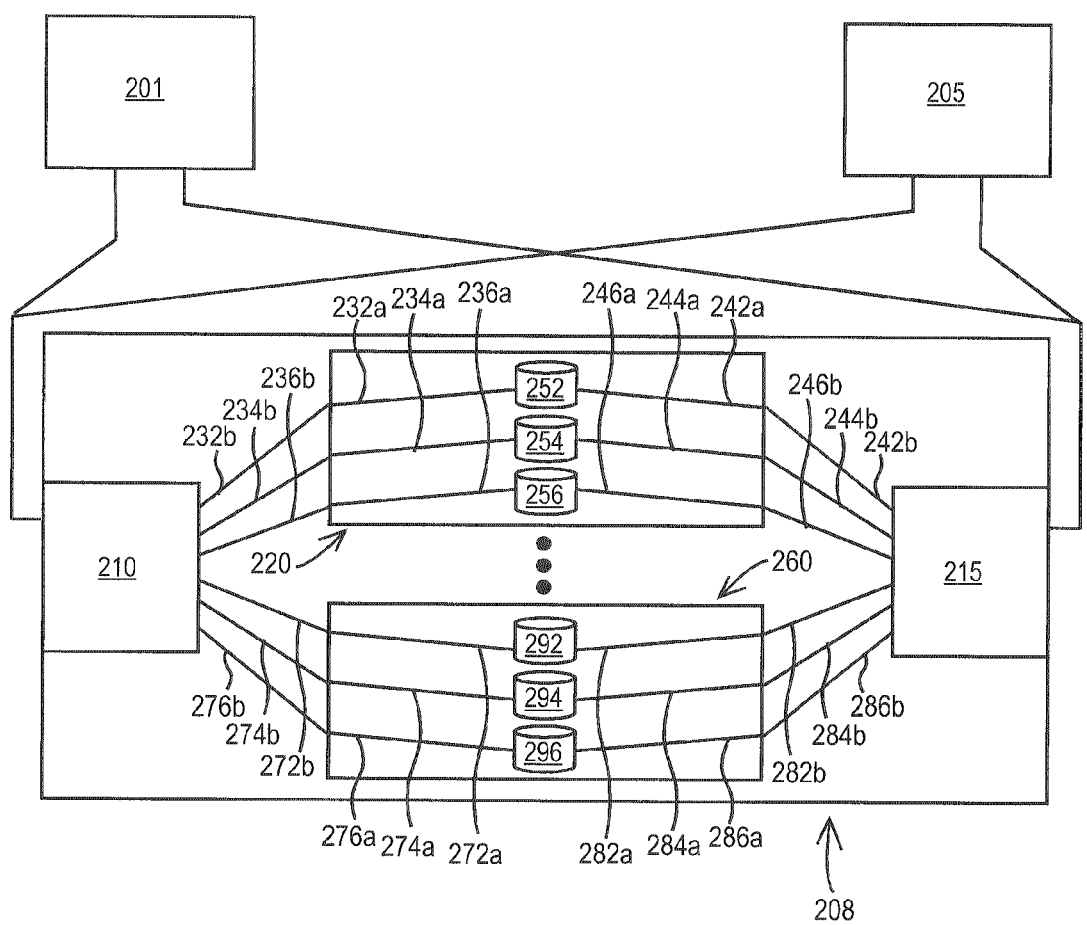
FIG. 2B is a block diagram showing a second embodiment of Applicants' data storage system comprising a data storage device enclosure comprising a plurality of data storage devices.

In the illustrated embodiments of FIGS. 2A and 2B, data storage device enclosure 208 comprises local controller 210, local controller 215, data storage device assembly 220, and data storage device assembly 260. In certain embodiments, data storage device enclosure 208 comprises an SBOD storage array, such as storage array 180 (FIG. 1). In other embodiments, data storage device enclosure 208 comprises a RAID storage array, such as storage array 180.

System controller 201 communicates bidirectionally with local controller 210 via communication link 202. System controller 201 communicates bidirectionally with local controller 215 via communication link 203. System controller 205 communicates bidirectionally with local controller 210 via communication link 206. System controller 205 communicates bidirectionally with local controller 215 via communication link 207.

In the illustrated embodiments of FIGS. 2A and 2B, data storage device enclosure 208 comprises two data storage device assemblies, namely data storage device assembly 220 and data storage device assembly 260. As a general matter, data storage device enclosure 208 comprises (M) data storage device assemblies, wherein (M) is greater than or equal to 2. In certain embodiments, (M) is 2. In other embodiments, (M) is 3. In yet other embodiments, (M) is 4. In still other embodiments, (M) is greater than 4.

In the illustrated embodiment of FIG. 2A, data storage device assembly 220 comprises repeater 230, repeater 240, and data storage devices 252, 254, and 256. As a general matter, data storage device assembly 220 comprises (N) data storage devices, wherein (N) is greater than or equal to 2. Repeater 230 communicates bidirectionally with data storage device 252, 254, and 256, via data storage device communication links 232, 234, and 236, respectively. Repeater 240 communicates bidirectionally with data storage device 252, 254, and 256, via data storage device communication links 242, 244, and 246, respectively. In the illustrated embodiment of FIG. 2A, data storage device assembly 260 comprises repeater 270, repeater 280, and data storage devices 292, 294, and 296. Repeaters 230, 240, 270, and 280, redrive SAS signals.

As a general matter, data storage device assembly 260 comprises (N) data storage devices, wherein (N) is greater than or equal to 2. Repeater 270 communicates bidirectionally with data storage device 292, 294, and 296, via data storage device communication links 272, 274, and 276, respectively. Repeater 280 communicates bidirectionally with data storage device 272, 274, and 276, via data storage device communication links 282, 284, and 286, respectively. Local controller 210 communicates bidirectionally with repeater 230 via local controller communication link 214. Local controller 210 communicates bidirectionally with repeater 270 via local controller communication link 216. Local controller 215 communicates bidirectionally with repeater 240 via local controller communication link 217. Local controller 215 communicates bidirectionally with repeater 280 via local controller communication link 219.

In the illustrated embodiment of FIG. 2B, data storage device assembly 220 comprises data storage devices 252, 254, and 256. Local controller 210 communicates with data storage device 252 via communication links 232a and 232b. Local controller 210 communicates with data storage device 254 via communication links 234a and 234b. Local controller 210 communicates with data storage device 256 via communication links 236a and 236b. Local controller 215 communicates with data storage device 252 via communication links 242a and 242b. Local controller 215 communicates with data storage device 254 via communication links 244a and 244b. Local controller 215 communicates with data storage device 256 via communication links 246a and 246b.

In the illustrated embodiment of FIG. 2B, data storage device assembly 260 comprises data storage devices 292, 294, and 296. Local controller 210 communicates with data storage device 292 via communication links 272a and 272b. Local controller 210 communicates with data storage device 294 via communication links 274a and 274b. Local controller 210 communicates with data storage device 296 via communication links 276a and 276b. Local controller 215 communicates with data storage device 292 via communication links 282a and 282b. Local controller 215 communicates with data storage device 294 via communication links 284a and 284b. Local controller 215 communicates with data storage device 296 via communication links 286a and 286b.

Figure 3A:
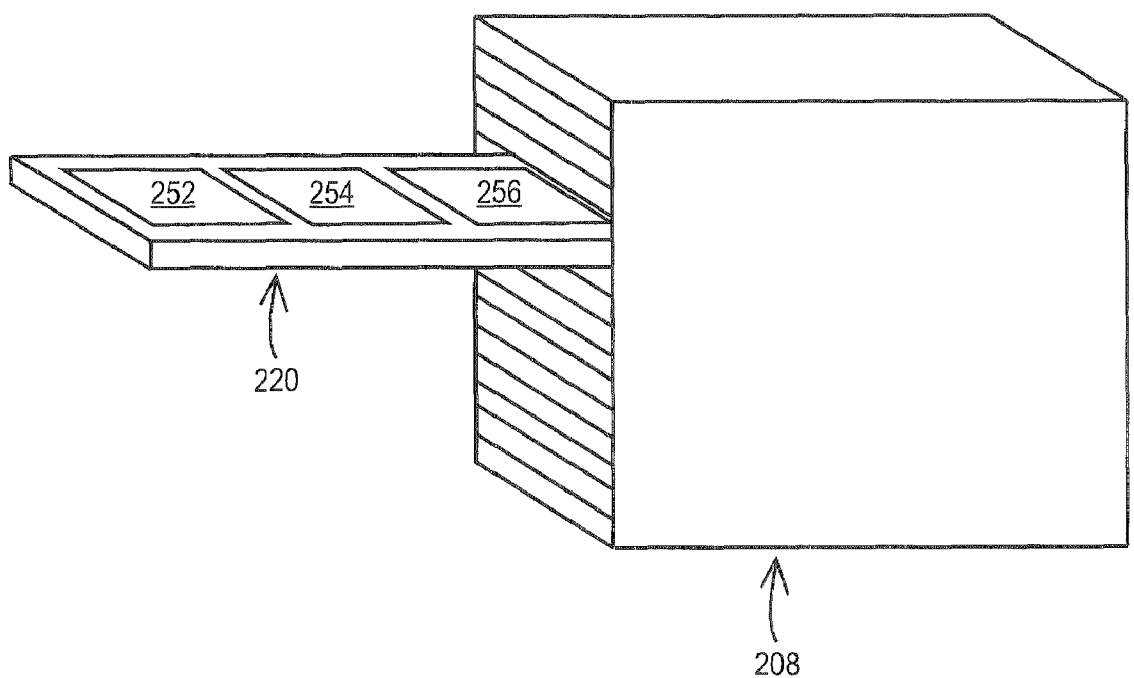
FIG. 3A is a perspective view of one embodiment of Applicants' data storage device enclosure, wherein that enclosure comprises a plurality of data storage devices.

FIG. 3A shows one embodiment of data storage device enclosure 208 (FIGS. 2A, 2B, 3A, 3B), wherein each data storage device assembly, such as assemblies 220 (FIGS. 2A, 2B) and 260 (FIGS. 2A, 2B), comprise a slideable tray disposed within data storage device enclosure 208. In certain embodiments, Applicants' data storage device enclosure comprises about 8 individual data storage device assemblies, i.e. slideable trays. In other embodiments, Applicants' data storage device enclosure comprises fewer than 8 individual data storage device assemblies, i.e. slideable trays. In yet other embodiments, Applicants' data storage device enclosure comprises more than 8 individual data storage device assemblies, i.e. slideable trays.

In the event one of the data storage devices disposed in Applicants' data storage system fails, then that device must be either repaired or replaced. As those skilled in the art will appreciate, in order to either repair or replace a failed data storage device, the power to that data storage device must be temporarily discontinued for the period of time needed to locate the failed device, and then repair or replace that failed device.

After discontinuing the supply of power to the failed data storage device, however, it can be difficult to identify the failed device. Applicants' apparatus and method provide visual indicators that can visually indicate a failed data storage device disposed in a data storage device enclosure even after the power to that failed device has been interrupted.

Figure 3B:
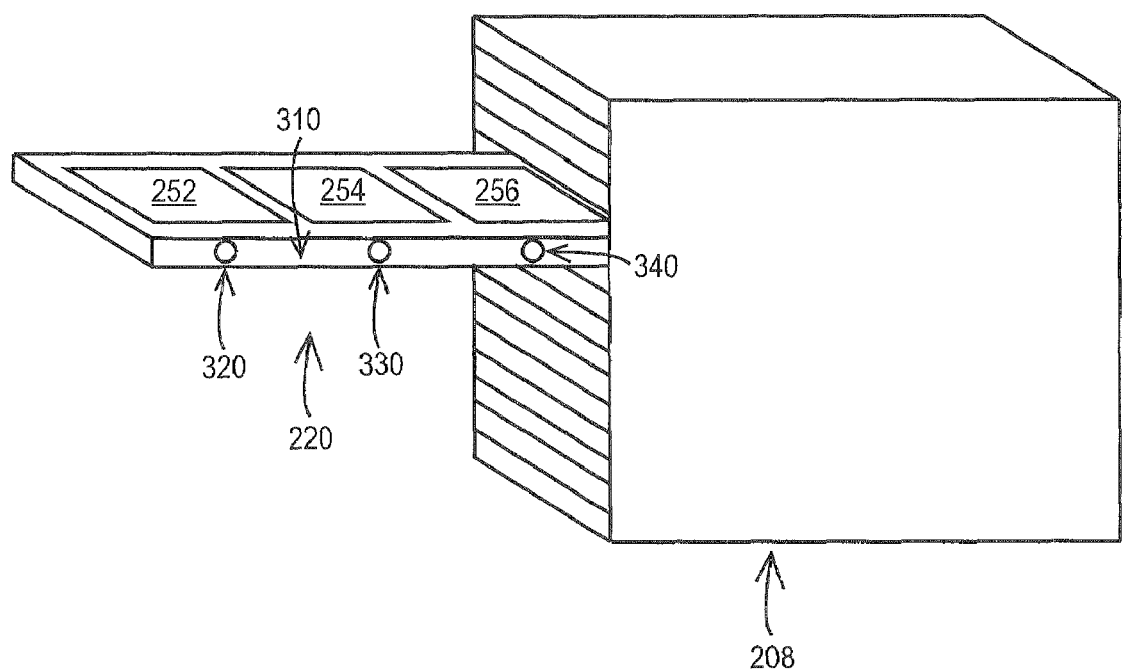
FIG. 3B is a perspective view of the data storage device enclosure of FIG. 3A further comprising a plurality of visual indicators.

FIG. 3B shows Applicants' visual indicators 320, 330, and 340, disposed on surface 310 of slideable tray 220. Visual indicators 320, 330, and/or 340, can continue to emit visible light even when the power to those indicators and/or to the data storage device enclosure 208 has been interrupted.

In the illustrated embodiment of FIG. 3B, visual indicators 320, 330, and/or 340, are disposed on the slide portion of a slideable tray disposed in Applicants' data storage device enclosure. In other embodiments, Applicants' visual indicators are disposed on the front portion of Applicants' data storage device enclosure. In yet other embodiments, Applicants' visual indicators are disposed on the rear portion of Applicants' data storage device enclosure. In other embodiments, Applicants' visual indicator is disposed on the printed circuit board assembly to which the associated device is also disposed.

Figure 4A:
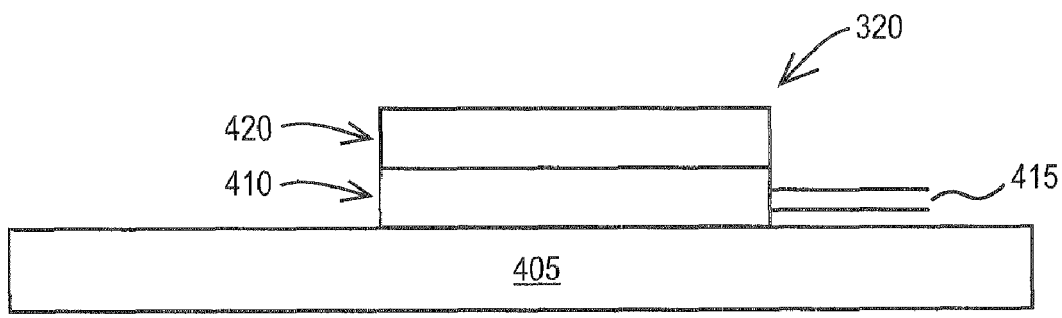
FIG. 4A is a cross-sectional view of a first embodiment of Applicants' visual indicator comprising an excitation device in combination with a light-emitting layer.

FIG. 4A shows the elements comprising Applicants' visual indicators, such as visual indicator 320. Referring now to FIG. 4A, Applicants' visual indicator 320 comprises excitation device 410 and light-emitting layer 420 disposed on excitation device 410, wherein excitation device 410 is disposed on substrate 405. In certain embodiments, substrate 405 comprises a surface disposed on the exterior of a housing, enclosure, chassis, and the like. In other embodiments, substrate 405 comprises a portion of an assembly, such as and without limitation a storage device, power supply, controller, and the like, disposed within a computing system. In other embodiments, substrate 405 comprises a circuit board disposed within a computing device or within an assembly disposed within a computing device.

Power leads 415 provide power to excitation device 410. In certain embodiments, light emitting layer 420 comprises a phosphorescent material. In certain embodiments, light emitting layer 420 comprises a thermoluminescent material.

Figure 6A:
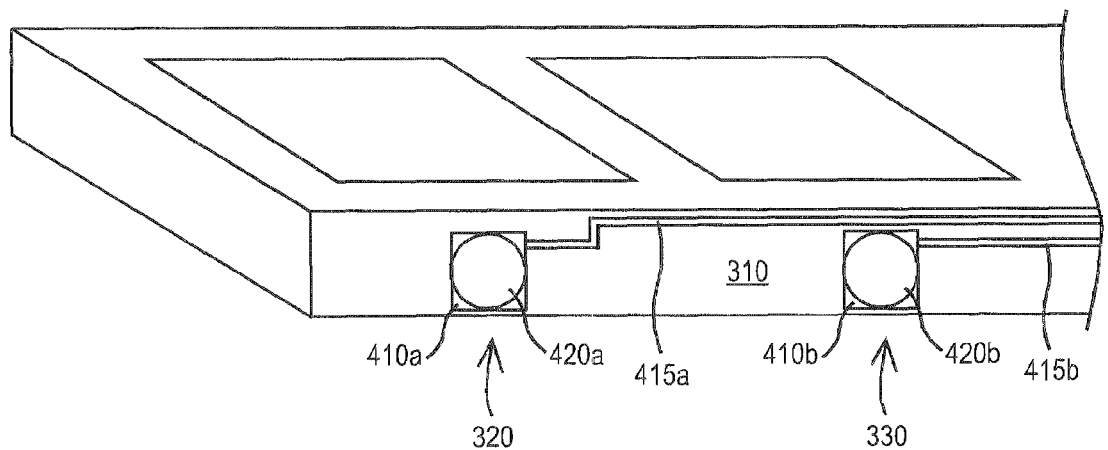
FIG. 6A shows one embodiment of Applicants' data storage system wherein a circular visual indicator is associated with each data storage device.
Figure 6B:
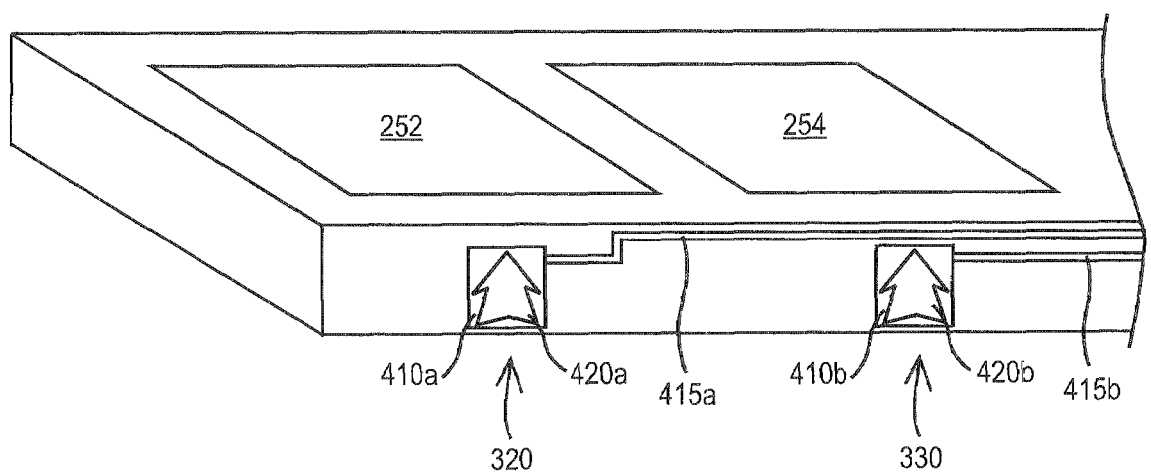
FIG. 6B shows a second embodiment of Applicants' data storage system wherein an arrow-shaped visual indicator is associated with each data storage device.

In the illustrated embodiment of FIG. 6A, visual indicators 320 and 330 comprise a circular light-emitting layer 420a and 420b, respectively, disposed on excitation devices 410a and 410b, respectively. In the illustrated embodiment of FIG. 6B, visual indicators 320 and 330 comprise a arrow-shaped light-emitting layer 420a and 420b, respectively, disposed on excitation devices 410a and 410b, respectively, and pointing to the associated data storage devices 252 and 254, respectively.

As those skilled in the art will appreciate, phosphorescence is a specific type of photoluminescence, related to fluorescence, however unlike fluorescence, a phosphorescent material does not immediately discharge the radiation it absorbs. The slower time scales of the re-emission of the radiation are associated with quantum mechanically forbidden energy state transitions.

Phosphorescence comprises a process wherein energy stored in a substance is released slowly and continuously in the form of glowing light. The slow rate of energy release during phosphorescence results from the low probability that the phosphorescence process will occur. In essence, phosphorescence comprises what is sometimes called a "forbidden mechanism," wherein that mechanism is virtually forbidden quantum mechanically.

In contrast, most photoluminescent events, in which a chemical substrate absorbs and then re-emits a photon of light, are rapid, on the order of 10 nanoseconds. However, for light to be absorbed and emitted at these fast time scales, the energy of the photons involved (i.e. the wavelength of the light) must be carefully tuned according to the rules of quantum mechanics to match the available energy states and allowed transitions of the substrate.

In the special case of phosphorescence, the absorbed photon energy undergoes an unusual intersystem crossing into an energy state of higher spin multiplicity, usually a triplet state. As a result, the energy can become trapped in the triplet state with only quantum mechanically "forbidden" transitions available to return to the lower energy state, as shown in Processes (i), (ii), and (iii).

$$\text{Excitation: } S_0 + h\nu_1 \rightarrow S_1 \tag{i}$$

$$\text{Singlet To Triplet Transition: } S_1 \rightarrow T_1 \tag{ii}$$

$$\text{Light Emission: } T_1 \rightarrow S_0 + h\nu_2 \tag{iii}$$

Processes (ii) and (iii), although "forbidden", will still occur but are kinetically unfavored and thus progresses at significantly slower time scales. Many phosphorescent compounds are still relatively fast emitters, with triplet lifetimes on the order of milliseconds. However, some compounds have triplet lifetimes up to minutes or even hours, allowing these substances to effectively store light energy in the form of very slowly degrading excited electron states. If the phosphorescent quantum yield is high, these substances will release significant amounts of light over long time scales, creating so-called "glow in the dark" materials.

As those skilled in the art will appreciate, thermoluminescence comprises fluorescence stimulated by the application of heat, to temperatures below those that result in incandescence. Fluorescence occurs when a molecule is excited from a ground state $S_0$ to an electroically excited state $S_1$, in process (iv), and then almost immediately relaxes back to the ground state $S_0$ with the emission of a photon in process (v).

$$\text{Excitation: } S_0 + \text{energy} \rightarrow S_1 \tag{iv}$$

$$\text{Light Emission: } S \rightarrow S_0 + h\nu \tag{v}$$

When a processor disposed in Applicants' data storage system detects a failed data storage device, that processor activates the visual indicator, such as visual indicator 320, associated with the failed device by energizing the excitation device element, such as excitation device 410, of that selected visual indicator. That excitation device then emits energy comprising either photons or heat, to boost electrons disposed in the light-emitting layer portion of the visual indicator to a higher energy level.

Even after the power to the data storage device enclosure housing the failed data storage device is disrupted, the light emitting layer layer portion of the activated visual indicator continues to emit visible light thereby identifying the failed device. For example and referring now to FIG. 6C, visual indicator 330 is shown emitting visible light from arrow-shaped phosphorescent layer 420b even after power to activation device 410b has been discontinued.

None of Applicants' visual indicators comprises a capacitor. In certain embodiments, Applicants+ visual indicator continues to emit visual light for at least one minute after power to the excitation device portion has been discontinued. In certain embodiments, Applicants' visual indicator continues to emit visual light for at least five minutes after power to the excitation device portion has been discontinued. In certain embodiments, Applicants' visual indicator continues to emit visual light for at least thirty minutes after power to the excitation device portion has been discontinued. In certain embodiments, Applicants' visual indicator continues to emit visual light for at least sixty minutes after power to the excitation device portion has been discontinued.

In certain embodiments, excitation device 410 comprises a light emitting diode. In certain embodiments, excitation device 410 comprises a light emitting polymer in embodiments wherein excitation device emits light, light emitting layer 420 comprises a phosphorescent material.

In certain embodiments, excitation device 410 comprises a heater. By "heater," Applicants mean a device that when supplied with electric power generates heat. In certain embodiments, excitation device 410 comprises a resistive element interconnected with power leads 415. In these heater embodiments, light emitting layer 420 comprises a thermoluminescent material. In these embodiments, the excitation device 410 remains hot for a period of time after the supply of power to that excitation device is interrupted. As a result, the thermoluminescent layer continues to emit light after the supply of power to the excitation device is interrupted.

Figure 4B:
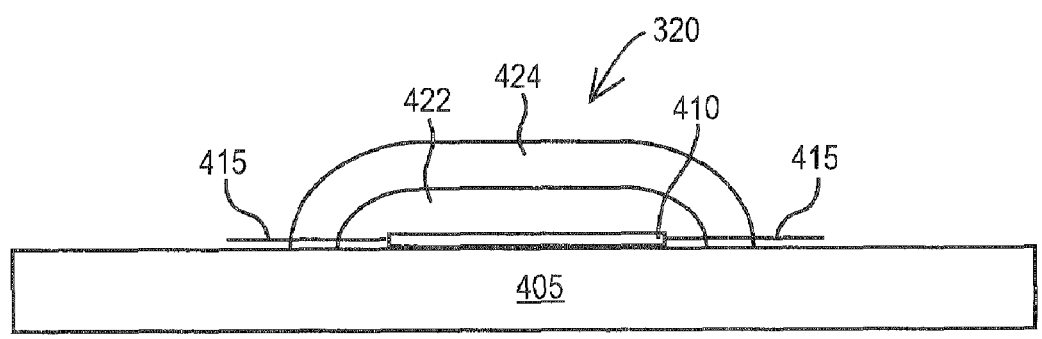
FIG. 4B is a cross-sectional view of a second embodiment of Applicants' visual indicator comprising an excitation device in combination with a light-emitting layer

Referring now to FIGS. 4A and 4B, in certain embodiments, light emitting layer 420 comprises a thermoluminescent material in combination with a fluorescent material. For example in the illustrated embodiment of FIG. 4B, visual indicator 320 comprises a heater 410 disposed on substrate 405. In certain embodiments, heater 410 comprises one or more resistors. Further in the illustrated embodiment of FIG. 4B, light emitting layer 420 (FIG. 4A) comprises a first layer 422 comprising a thermoluminescent material partially or completely covering heater 410. In the illustrated embodiment of FIG. 4B, light emitting layer 320 further comprises a second layer 424 comprising a fluorescent material, wherein layer 424 partially or completely covers layer 422.

When heater 410 is energized using leads 415, heater 410 heats thermoluminescent layer 422 causing layer 422 to emit first photons, wherein those first photons are captured by fluorescent layer 424 thereby energizing fluorescent layer 424 which emits second photons, wherein those second photons comprise energy in the visible spectrum.

Figure 5:
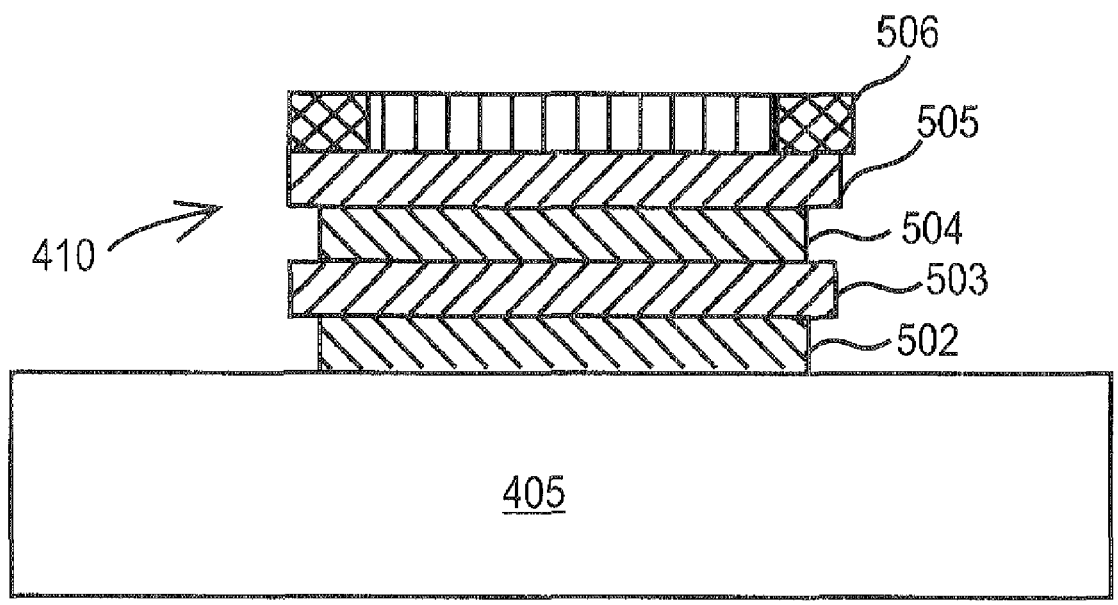
FIG. 5 is cross-sectional of an excitation device comprising a light emitting polymer.

In the illustrated embodiment of FIG. 5, excitation device 410 comprises an electroluminescent device fabricated with encapsulated light emitting polymer particles. U.S. Pat. No. 7,001,639, teaches such en electroluminescent device fabricated with encapsulated light emitting polymer particles, and is hereby incorporated by reference. Those skilled in the art will appreciate, that other light-emitting polymers are known in the art. This being the case, references herein to "light emitting polymers" are not limited to the teachings of the '639 Patent.

The embodiment of Applicants' excitation device 410 shown in Applicants' FIG. 5 comprises a rear electrode layer 502, a dielectric layer 503, an illumination layer 504, an electrically conductive layer 505, and a front outlining electrode lead ('front electrode') 506, disposed on substrate 310. Substrate 405 may comprise either metal or an electrically non-conducting material. If, for example, an aluminum substrate is used, then it is first coated with an insulative material.

Rear electrode 502 is formed of an electrically conductive material, e.g., silver or carbon particles. Dielectric layer 503 is formed of high dielectric constant material, such as barium titanate. Illumination layer 504 is formed of light emitting polymer particles. Front electrode 506 may be formed of silver particles or other electrically conductive material.

In certain embodiments, the light emitting polymer particles are prepared by micronizing using an air mill or grinding them to an ultimate particle size of approximately 50 microns or less. In certain embodiments, such small particles are obtained directly in the synthetic process for preparation of the polymer. In certain embodiments, Applicants' light emitting polymer is selected from the group consisting of polypyridine, poly(p-phenylene vinylene) or poly[2-methoxy-5-(2'-ethylhex-yloxy)-1,4-phenylenevinylene] may be used. Additional light-emitting polymers include polyl[2-methoxy-5-(2-ethylhexyloxy)-1,4-phenylene-vinylene]; poly[(2-methox-y-5-(2-ethylhexyloxy)-1,4-phenylene-vinylene)-alt-co-(4,4'-biphenylene-vin-ylene)]; poly[(9,9-dioctyl-2,7-divinylenefluorenylene)-alt-co(9,10-anthrac-ene)]; poly[(9,9-dioctyl-2,7-divinylenefluorenylene)-alt-co-(4,4'-biphenyl-ene)]; poly[{9,9-dioctyl-2,7-divinylene-fluorenylene}-alt-co-{2-methoxy-5-(2-ethyl-hexyloxy)-1,4-phenylene}]; poly[{9,9-dioctyl-2,7-bis(2-cyanovinyl-ene-fluorenylene}-alt-co-{2-methoxy-5-(2-ethylhexyloxy)-1,4-phenylene}]; poly[2-methoxy-5-(2-ethylhexyloxy)-1,4-(1-cyanovinylenephenylene)]; poly[{9,9-dihexyl2,7-bis(1-cyanovinylene)fluorenylene}-alt-co-{2,5-bis(N,N'-diphenylamino)-1,4-phenylene}]; poly[{9-ethyl-3,6-bis(2-cyanovinylene)-carbazolylene)}-alt-co-{2-methoxy-5-(2-ethylhexyloxy)-1,4-phenylene}]; poly[(9,9-di(2-ethylhexyl)-fluorenyl-2,7-diyl)-co-(N,N'-diphenyl)-N,N'-di-(p-butyl phenyl)-1,4-diaminobenzenel; poly[2-(6-cyano-6-methylhepty-loxy)-1,4-phenylene); poly]{9,9-dioctylfluorenyl-2,7-diyl}-co-{1,4-(2,5-di-methoxy)benzen poly[{9,9-dioctylfluorenyl-2,7-diyl}-co{1,4-(2,5-dimethoxy)benzene}]; poly[(9,9-dioctylfluorenyl-2,7-diyl)-co-(1-,4-ethylenylbenzene)]; poly[(9,9-dioctylfluorenyl-2,7-diyl)-co-(1,4-diphen-ylene-vinylene-2-methoxy-5-{2-ethylhexyloxy}-benzene)]; poly[(9,9-dihexylfluorenyl-2,7-divinylenefluorenylene)]; poly[(9,9-dihexyl-2,7-(2-cyanodivinylene)fluorenylene)]; poly[(9,9-dioctylfluorenyl-2,7-diyl)-co-(1,4-vinylenephenylene)]; poly[(9,9-dioctylfluorenyl-2,7-diyl)-co-(1,4-vinylenephenylene)]; poly(9,9-dioctylfluorenyl-2,7-diyl; poly(9,9-dihexylfluorenyl-2,7-diyl); poly[9,9-di-(2-ethylhexyl)-fluorenyl-2,7-diyl]; poly[(9,9-dioctylfluorenyl-2,7-diyl)-co-(N,N'-diphenyl)-N,N'-di(p-butyloxyphenyl)-1,4-diaminobenzen-e)]; poly[(9,9-dioctylfluorenyl-2,7-diyl)-alt-co-(N,N'-diphenyl)-N,N'-di(p-butyloxy-phenyl)1,4-diaminobenzene)]; poly[(9, 9-dihexylfluorenyl-2,7-diy-l)-co-(1,4-benzo-2,1',3}-thiadiazole)]; poly[(9,9-dihexylfluorenyl-2,7-di-yl)-alt-co-(9,10-anthracene)]; poly[(9,9-dioctylfluorenyl-2,7-diyl)-alt-co-(N, N'-bis{4-butylphenyl}-benzidine-N,N'-{1,4-diphenylene})]; poly[(9,9-dihexylfluorenyl-2,7-diyl)-alt-co-(2-methoxy-5-{2-ethylhexyloxy-}-1,4-phenylene)]; poly[(9, 9-dihexylfluorenyl-2,7-diyl)-co-(9,ethyl-3,6-ca-rbazole)]; poly[(9,9-dihexylfluorenyl-2,7-diyl)-alt-co-(9,ethyl-3,6-carbaz-ole)]; poly[(9,9-dihexylfluorenyl-2,7-diyl)-alt-co-(9,9'-spirobifluorene-2-,7-diyl]; poly[(9,9-dihexylfluorenyl-2,7-diy])-co-(2,5-p-xylene)]; poly[(9,9-dihezylfluorinl-2,7-diyl)-co-(3,5-pyridine)];poly[(9,9-dihexhgl-fluorenyl-2,7-diyl)-poly[(9,9-dihexylfluorenyl-2,7-diyl)-alt-co-(9,9-di-{5-pentanyl}-fluorenyl-2',7'-diyl; poly[(9,9-dihexylfluorenyl-2, 7-diyl)-co-(-6,6'{2,2'-bipyridine})]; poly[(9,9-dihexylfluorenyl-2,7-diyl)-co-(6,6'-{2,-2':6',2''-terpyridine})]; and poly[(9,9-dihexylfluorenyl-2,7-diyl)-co-(N,-N'bis{p-butylphenyl}-1,4-diamino phenylene)], all of which are commercially available from American Dye Source, Inc.

In other embodiments, Applicants' light emitting polymers comprise OLEDs (organic light emitting devices). As those skilled in the art will appreciate, light emitting polymers and OLEDs operate off low voltage and are more readily adaptable to being applied in thin layers than phosphors containing zinc sulfide, which exhibit graininess when applied as a thin coating.

In certain embodiments, Applicants' excitation device comprises one or more OLEDs selected from one or more organic and inorganic complexes, such as tris(8-hydroxyquinolato)aluminum; tetra(2-methyl-8-hydroxyquinolato) boron; lithium salt; 4,4'-bis(9-ethyl-3-carbazovinylene)-1,1'-biphenyl; 9,10-di[(9-ethyl-3-carbazoyl)-vinylenyl)]-anthracene; 4,4'-bis(diphenylvinylenyl)-biphenyl; 1,4-bis(9-ethyl-3-carbazovinylene)-2-methoxy-5-(2-ethylhexyloxy) benzene; tris(benzoylacetone)monophenantholi-ne)europium (III); tris(dibenzoylmethane)mono(phenanthroline)europium (III); tris(dibenzoylmethane)mono(5-aminophenantroline)europium (III); tris(dinapthoylmethane)monophenantroline)europium (III); tris(diphenoylmethane)mono(phenantroline)europium (III); tris(dibenzoylmethane)mono(4,7-diphenyl phenanthroline)europium (III); tris(dibenzoylmethane)mono(4,7-dimethyl-phenantroline)europium (III); tris(dibenzoylmethane)mono(4,7-dihydroxy-phenanthroline)europium (III); tris(dibenzoylmethane)mono(4,7-dihydroxyloxy-phenanthroline)europium (III); lithium tetra(2-methyl-8-hydroxyquinolinato)boron; lithium tetra(8-hydroxyquinolinato)boron; 4,4'-bis(9-ethyl-3-carbazovinylene)-1,-1'-biphenyl; bis(8-hydroxyquinolinato)zinc; bis(2-methyl-8-hydroxyquinolin-ato)zinc; Iridium (III) tris(2-phenylpyridine); tris(8-hydroxyquinoline)al-uminum; and tris[1-phenyl-3-methyl-4-(2,2-dimethylpropan-l-oyl)-pyrazolin-5-one]-terbium, many of which are commercially available from American Dye Source, Inc.

Figure 7:
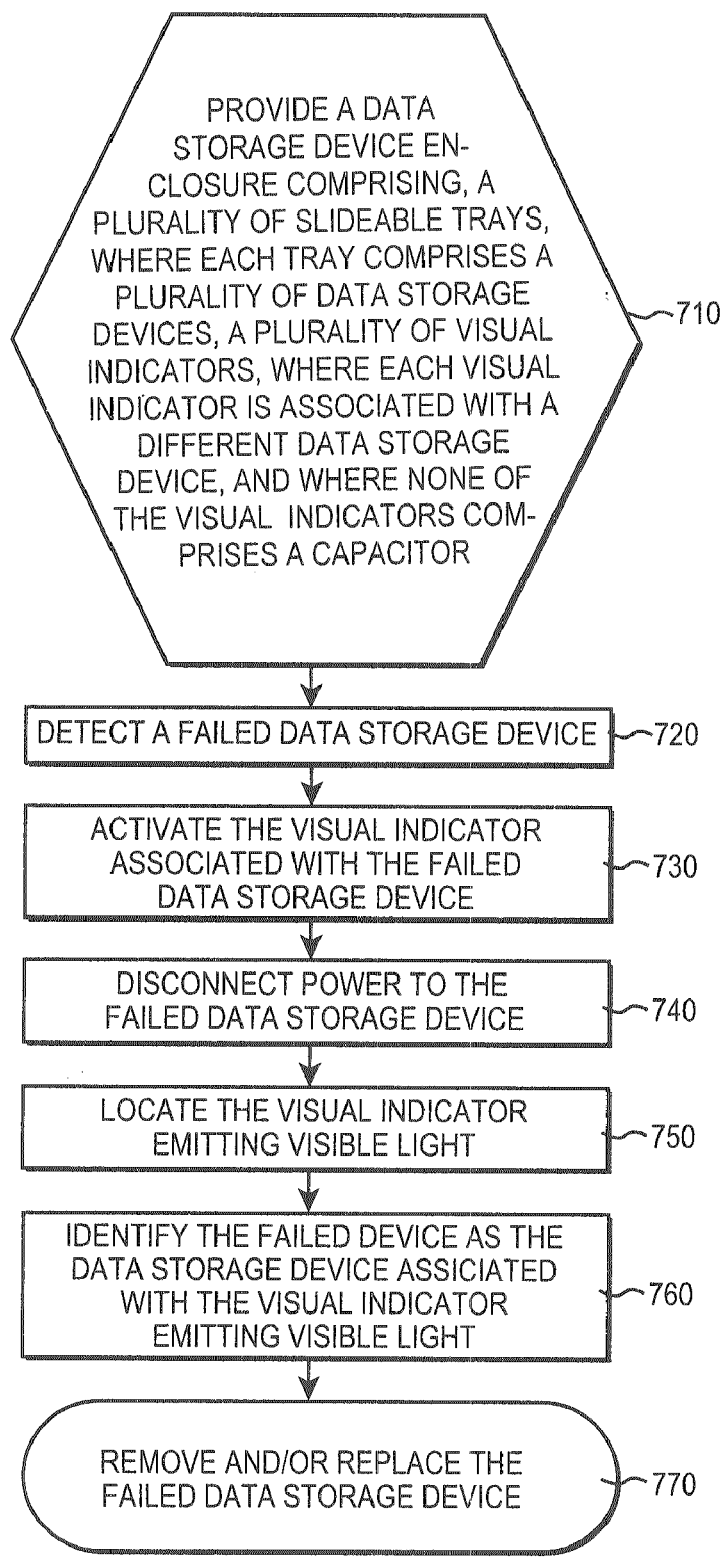
FIG. 7 is a flow chart summarizing the steps of Applicants' method.

Applicants' invention comprises a method to locate a failed data storage device disposed in Applicants' data storage system, such as system 100. FIG. 7 summarizes the steps of Applicants' method. Referring now to FIG. 7, in step 710 the method provides a data storage system comprising a plurality of data storage devices, and a plurality of Applicants' visual indicators, such as visual indicator 320, wherein each of the visual indicators is associated with a different of the plurality of data storage devices, In certain embodiments, Applicants' data storage system further comprises one or more data storage enclosures, such as enclosure 208. In certain embodiments, Applicants' data storage device enclosure comprises one or more trays slideably disposed therein.

In step 720, Applicants' method detects a failed data storage device. In certain embodiments, step 720 is performed by a system controller, such as system controller 201 (FIGS. 2A, 2B) or 205 (FIG. 2A, 2B). In certain embodiments, step 720 is performed by a local controller such as local controller 210 (FIGS. 2A, 2B) and/or local controller 215 (FIGS. 2A, 2B).

Applicants' method transitions from step 720 to step 730 wherein the method activates the visual indicator associated with the failed data storage device. In certain embodiments, step 730 comprises energizing the excitation device element, such as element 410 of the selected visual indicator. In certain embodiments, step 730 further comprises emitting photons by the energized excitation device. In certain embodiments, step 730 further comprises emitting thermal energy by the energized excitation device. In certain embodiments, step 730 further comprises boosting a plurality of electrons disposed in the light-emitting layer element of the selected visual indicator from a ground state to an excited state.

In certain embodiments, step 730 is performed by a system controller, such as system controller 201 (FIGS. 2A, 2B) or 205 (FIG. 2A, 2B). In certain embodiments, step 730 is performed by a local controller such as local controller 210 (FIGS. 2A, 2B) and/or local controller 215 (FIGS. 2A, 2B).

In step 740, Applicants' method discontinues the supply of power to the failed data storage device. In certain embodiments, step 740 further comprises discontinuing the supply of power to a data storage device assembly, such as assembly 220 (FIGS. 2A, 2B), comprising the failed data storage device. In certain embodiments, step 740 further comprises discontinuing the supply of power to a data storage device enclosure, such as data storage device enclosure 208, comprising the failed data storage device.

In certain embodiments, step 740 is performed by field service personnel. In certain embodiments, step 740 is performed by the owner and/or operator of the data storage system. In certain embodiments, step 740 is performed by a system controller, such as system controller 201 (FIGS. 2A, 2B) or 205 (FIG. 2A, 2B). In certain embodiments, step 740 is performed by a local controller such as local controller 210 (FIGS. 2A, 2B) and/or local controller 215 (FIGS. 2A, 2B).

Figure 6C:
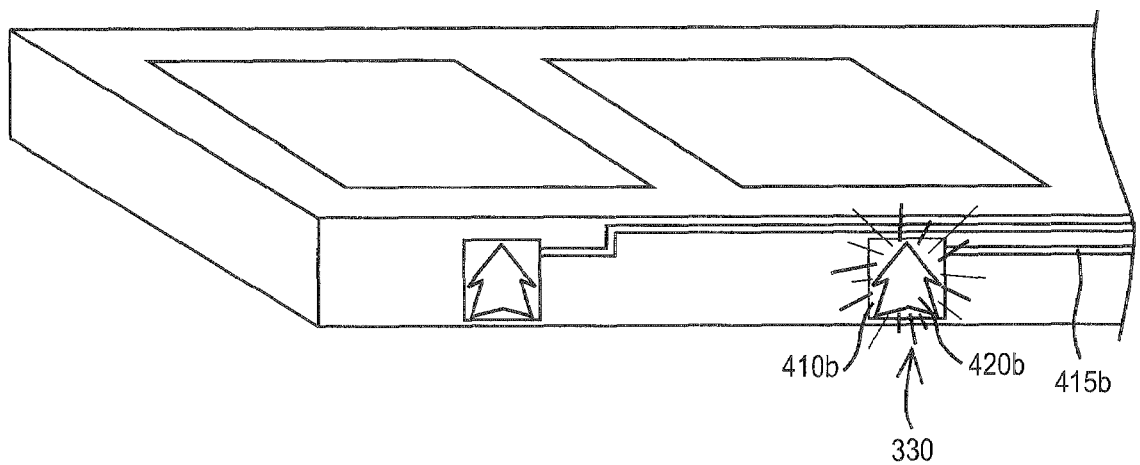
FIG. 6C shows one of the arrow-shaped visual indicator emitting light.

In step 750, Applicants' method locates the visual indicator, such as visual indicator 330 in FIG. 6C, that is emitting visible light. In certain embodiments, step 750 is performed by field service personnel. In certain embodiments, step 750 is performed by the owner and/or operator of the data storage system.

In step 760, Applicants' method identifies the failed data storage device as the data storage device associated with the illuminated visual indicator. In certain embodiments, step 760 is performed by field service personnel. In certain embodiments, step 760 is performed by the owner and/or operator of the data storage system.

In step 760, Applicants' method removes and/or repairs the failed data storage device. In certain embodiments, step 760 is performed by field service personnel. In certain embodiments, step 760 is performed by the owner and/or operator of the data storage system.

In certain embodiments, individual steps recited in FIG. 7 may be combined, eliminated, or reordered.

In certain embodiments, Applicants' invention includes instructions residing in memory 133 (FIG. 1) and/or memory 143 (FIG. 1), where those instructions are executed by a processor, such as processor 132 (FIGS. 1, 2) and/or 142 (FIGS. 1, 2), respectively, to perform one or more of steps 720, 730, and/or 740, recited in FIG. 7.

In other embodiments, Applicants' invention includes instructions residing in any other computer program product, where those instructions are executed by a computer external to, or internal to, system 100, to perform one or more of steps 720, 730, and/or 740, recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to locate a failed device in a computing system, comprising the steps of:
    providing a computing system comprising a plurality of devices, a plurality of visual indicators, wherein each of said plurality of visual indicators is interconnected with a power source and is associated with a different one of said plurality of devices, wherein each of said plurality of visual indicators after being energized continues to emit visible light for at least five minutes after power to that visual indicator has been discontinued, and wherein none of said plurality of visual indicators comprises a capacitor;
    detecting a failed device;
    energizing a visual indicator associated with said failed device;
    interrupting power to said plurality of devices and to said plurality of visual indicators;
    locating a visual indicator emitting visible light; and
    identifying the failed device as a device associated with the visual indicator emitting visible light
    wherein each of said plurality visual indicators comprises an excitation device and a light-emitting layer disposed on said excitation device; and
    wherein said excitation device comprises one or more resistors, and said light emitting layer comprises a thermoluminescent material disposed on said one or more resistors and a fluorescent material disposed on said thermoluminescent material.

2. A computing system, comprising:
    a plurality of devices;
    a plurality of visual indicators, wherein each of said plurality of visual indicators is interconnected with a power source and is associated with a different one of said plurality of devices, wherein each of said plurality of visual indicators after being energized continues to emit visible light for at least five minutes after power to that visual indicator has been discontinued;
    wherein:
    none of said plurality of visual indicators comprises a capacitor;
    each of said plurality visual indicators comprises an excitation device, and a light-emitting layer disposed on said excitation device;
    said light emitting layer comprises a phosphorescent material;
    said excitation device is selected from the group consisting of a light emitting diode and a light emitting polymer; and
    said light emitting layer comprises a thermoluminescent material.

3. The computing system of claim 2, wherein said excitation device comprises a heater.

4. A computing system, comprising:
    a plurality of devices;
    a plurality of visual indicators, wherein each of said plurality of visual indicators is interconnected with a power source and is associated with a different one of said plurality of devices, wherein each of said plurality of visual indicators after being energized continues to emit visible light for at least five minutes after power to that visual indicator has been discontinued;
    wherein:
    each of said plurality visual indicators comprises an excitation device, and a light-emitting layer disposed on said excitation device;
    said excitation device comprises one or more resistors; and
    said light emitting layer comprises a thermoluminescent material disposed on said one or more resistors and a fluorescent material disposed on said thermoluminescent material.

5. A data storage device enclosure, comprising:
    a plurality of data storage devices;
    a plurality of visual indicators, wherein each of said plurality of visual indicators is interconnected with a power source and is associated with a different one of said plurality of data storage devices, wherein each of said plurality of visual indicators after being energized continues to emit visible light for at least five minutes after power to that visual indicator has been discontinued;
    wherein:
    none of said plurality of visual indicators comprises a capacitor;
    each of said plurality visual indicators comprises an excitation device, and a light-emitting layer disposed on said excitation device;
    said excitation device comprises a heater.

* * * * *